July 26, 1960

T. A. HENSHAW 2,946,293

INDUCTORS

Filed April 18, 1955

2 Sheets-Sheet 1

Inventor
THOMAS ANTHONY HENSHAW
By
Larson & Whiting Attorney

July 26, 1960 T. A. HENSHAW 2,946,293
INDUCTORS
Filed April 18, 1955 2 Sheets-Sheet 2
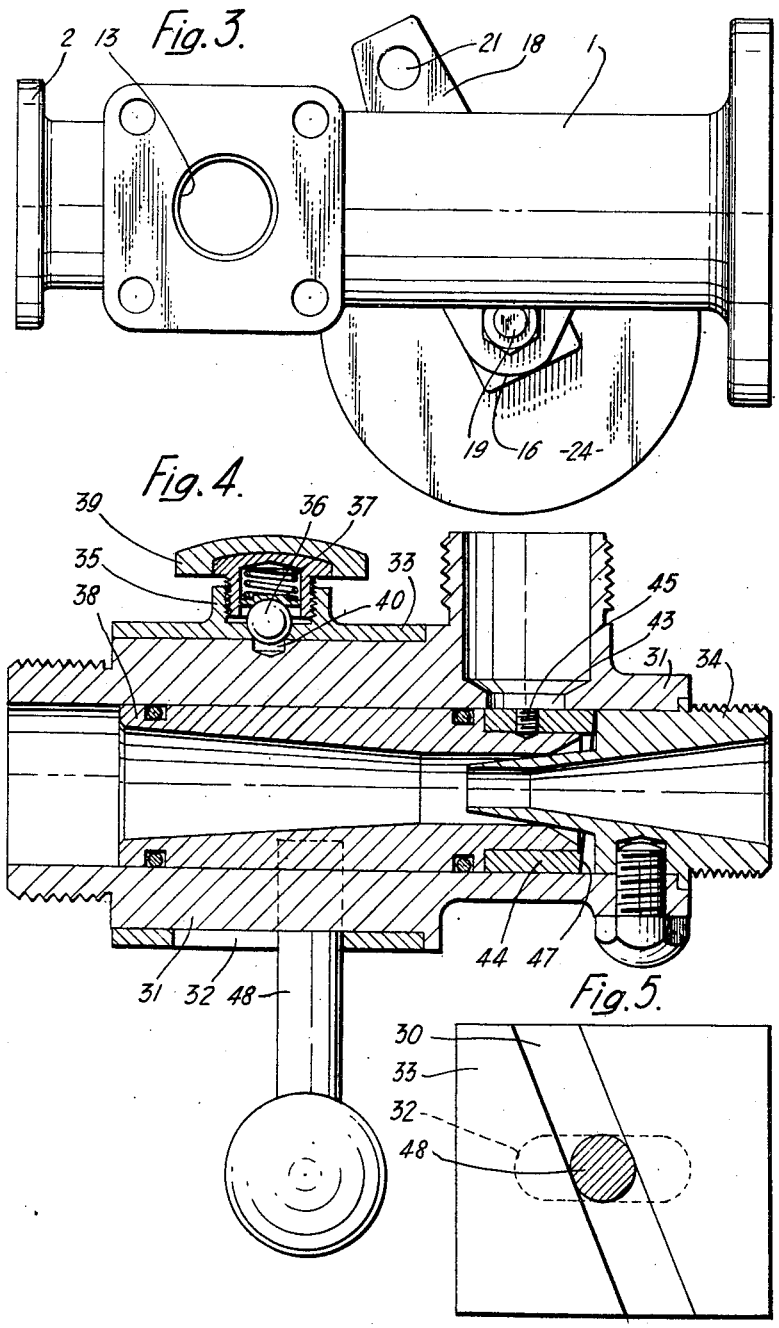
Inventor
THOMAS ANTHONY HENSHAW
By
Larson and Whiting Attorney

United States Patent Office 2,946,293
Patented July 26, 1960

2,946,293
INDUCTORS

Thomas Anthony Henshaw, Brentford, England, assignor to The Pyrene Company Limited, Brentford, England Filed Apr. 18, 1955, Ser. No. 502,173

7 Claims. (Cl. 103—273)

This invention relates to inductors for inducing one liquid into a flowing stream of another.

In the production of foam for fire-extinguishing purposes it is common to induce a concentrated foam-stabilising solution into a flowing stream of water by venturi action. The pressure of the flowing water is not always the same, and even if it is the rate at which foam is required to be produced may vary. Whatever the variations however, a predetermined ratio of foam-stabilising solution to water should be maintained, as the quality of the foam produced is dependent upon it. The existing inductors do not serve to maintain such a ratio under varying conditions.

An object of the present invention is to provide an inductor that can easily be adjusted to vary the rate of production of foam while maintaining the quality unchanged.

In this invention an inductor comprises a jet member and a throat member that are relatively movable axially in a casing to vary the space between the two through which foam-stabilising solution can be induced by a water stream, and the relative movement also controls the size of a port in the casing through which the induced solution can flow to the space between the jet and throat members. Preferably this port is entirely closed when the maximum relative movement between the throat and jet members has taken place.

Figure 1:
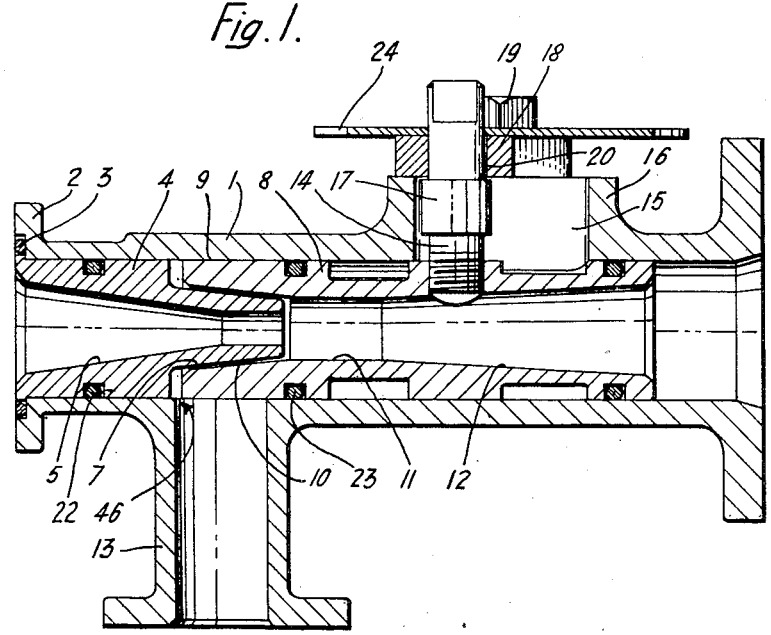
Figure 2:
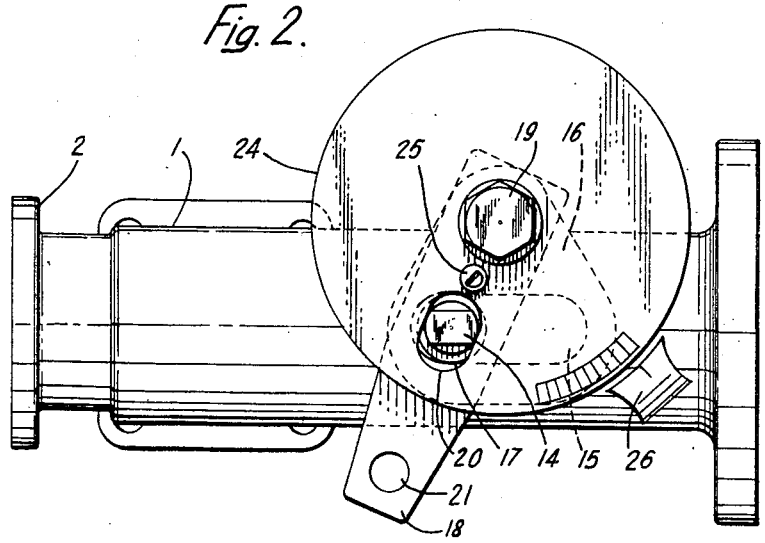

The invention will be more readily understood by reference to the accompanying drawings which show two inductors according to the invention and in which:

Figure 1 is an axial section through one inductor;
Figure 2 is a plan view of this inductor;
Figure 3 is a view of the same inductor from below;
Figure 4 is an axial section through the second inductor; and
Figure 5 shows a detail of the inductor shown in Figure 4.

The inductor shown in Figures 1 to 3 comprises a tubular casing 1 with an end flange 2 for connection to a similar flange on a water-supply pipe, a ring 3 being provided as a packing to make a water-tight joint. A jet member 4 is fixed in the inlet end of the casing 1 and has a conical bore 5 merging into a cylindrical bore 6. The outlet end of the jet member is externally conical as shown at 7. The jet of water delivered by this jet member enters a throat member 8.

The entry end of the member 8 is externally cylindrical, as shown at 9, and internally conical at 10 to mate with the conical part 7 of the member 4. The conical part 10 merges into a cylindrical part 11, which in turn merges into a flaring part 12.

The casing 1 has a tubular branch 13 for connection to a pipe supplying foam-stabilising solution into the water stream flowing through the inductor. The mouth of this branch forms a port 46 which is controlled by the cylindrical part 9 of the throat member. The amount of solution induced through the port 13 by the water stream depends on the extent to which this port is open and on the size of the annular space between the conical parts 7 and 10. Both these in turn depend on the axial position of the throat member 8.

The member 8 can slide in the casing 1 and is tapped to receive the threaded end of a radial arm 14 which extends through a slot 15 in a boss 16 on the casing and which has a cylindrical part 17 fitting closely in the slot. A lever 18 is mounted to rock round a bolt 19 which passes through a flange-like part of the boss 16. This lever has a slot 20 through which the arm 14 passes. When the lever is turned the arm 14 is forced to move through the slot 15, the slot 20 providing the requisite freedom of movement.

In one extreme position of the lever 18 the surfaces 7 and 10 mate and simultaneously the port 46 is wholly closed by the cylindrical part 9 of the throat member, which acts as a sleeve valve.

The lever 18 may have to be operated by remote control, and for this purpose a hole 21 for the reception of a mechanical connecting member is made in it.

In order to allow sufficient relative movement of the throat and jet members to effect the opening and closing of the sleeve valve without substantially altering the characteristics of the inductor, the mating surfaces 7 and 10 have a long taper. This allows streamline flow to be maintained at all settings with consequent minimum loss of pressure energy. It has not been uncommon in other inductors for the volume of water required to produce the induction to be three times that of the foam-stabilising solution induced. When the present inductor is fully open the volume of water required is only approximately equal to that of the foam-stabilising solution induced.

In the inductor shown the rate of induction of foam-stabilising solution, for a given rate of flow of water, is controlled not only by the setting of the throat and jet members in relation to one another but also by the degree of opening of the port 46. This allows the desired ratio to be maintained more nearly constant at varying rates of water flow than is possible if there is only one control.

One form of fire-extinguishing apparatus at present in use includes a pump which supplies water and foam-stabilising solution to all or only some of a number of foam generators. In accordance with the number of generators in use a corresponding amount of foam-stabilising solution can be induced into the water delivered by the pump. In this apparatus some of the water delivered by the pump is supplied to a number of inductors, equal to the number of generators, and the inductors all deliver into the suction side of the pump. Each inductor is connected to a reservoir of solution by a suction pipe controlled by a plug cock, which allows a predetermined quantity of foam-stabilising solution to be induced. As many cocks are opened as there are generators in use. This apparatus is very satisfactory if it is properly cared for, but if the apparatus is neglected and the solution is allowed to dry on them there is some danger that they may become stuck. No provision is made to induce intermediate quantities of foam-stabilising solution to suit varying conditions such as the use of different sizes of generators or different required ratios of solution to water. Moreover, the battery of inductors is somewhat bulky.

An inductor according to the invention can be used with particular advantage instead of the battery of inductors in the apparatus described above, the water that flows through it being delivered by and returned to the pump inlet. Then no cocks controlling concentrated foam-stabilising solution are required, and the sliding action of the sleeve valve reduces the disk of clogging in the port in the wall of the casing. Only a single control is necessary and this can be operated easily by remote control through the handle 18 if required, e.g. when the apparatus is mounted on a crash tender. As a single venturi is used irrespective of the rate of induction required, no combining of separate streams into a common line is required. This also means that an adequate energy-recovery section can be provided in the inductor to enable the kinetic energy of the water jet to be restored into pressure energy with resulting improvement in performance and efficiecny and without making the apparatus too bulky.

When the inductor is used in conjunction with a pump, it is important that there should be no leakage of air which might interfere with the priming of the pump. To avoid any such leakage the throat member 8 is caused not only to close the port 46 on the casing but also to fit tightly over the jet member 4 in the extreme position of its movement. In addition a tight seal between the casing 1 and the jet and throat members on each side of the port 46 is ensured by O-section sealing rings 22 and 23 respectively. This sealing is also advantageous if the stabilising solution is supplied to the inductor under a head of liquid.

An inductor according to the invention may also be used in a main water pipe line, the ratio of solution to water being then of course less, since all the water for the production of foam must pass through the inductor. When inductors are used in this way the ratio of foam-stabilising solution induced to water flowing tends to diminish as the back pressure in the line increases, as for example by adding extra lengths of hose. This disadvantage may be overcome by adjustment when using the inductor of the present invention.

The angular position of the lever 18 may be calibrated in terms of gallons per minute of foam compound induced for a predetermined pressure of water, or, when the inductor is used in a main water line, in terms of the number of lengths of hose. To enable the throat member to be readily located in any one of several predetermined positions, corresponding for instance to different numbers of foam generators to be supplied or different lengths of hose, an indicator disc 24 is mounted on the arm 14 and carries markings registering with a mark on a bracket 26. This disc 24 can be turned in relation to the handle 18 and then secured in position by a grub screw 25.

When the inductor is in use the water pressure exerted axially on its is substantial, but most of the pressure is exerted against the jet member. This is one of the reasons why it is preferred to fix the jet member rather than the throat member. Another reason is that the overall length of the device can be shorter than if the jet member is made to move.

The port 46 need not be circular, but may be of other shapes to allow the solution to be passed at appropriate rates.

In the modification shown in Figures 4 and 5 there are a fixed jet member 34 and a sliding throat member 38 in a casing 31, the member 38 controlling a port 43. This throat member is engaged by a radial arm 48 which extends through a helical slot 30 in the casting and an axial slot 32 in a sleeve 33 surrounding and free to rotate on the casing. The sleeve carries a housing 35 for a ball 36 loaded by a spring 37 which is retained in place by a cap 39. This ball engages in one or another of depressions 40 in the outer surface of the casing 31.

The throat member 38 is moved axially when it is turned within the casing 31 by means of the arm 48, since the arm is guided by the helical slot 30 and is free to move in the slot 32. The co-operation of the ball 36 with one or another depression 40 enables the throat member to be set in predetermined position.

In this modification, the throat member 38 is composite, the part opposite the port 43 consisting of a ring 44 which can turn in relation to the remainder of the member and which varies in axial length around its circumference, i.e. its end face 47 lies in a plane inclined to the axis. Therefore by turning the ring 44 in relation to the remainder of the member 8, the point in the axial movement of the member 8 at which the ring 44 just closes the port 13 can be adjusted. The ring can be fixed in its adjusted position by a grub screw 45 accessible through the port. By making the member composite in this way, the need to manufacture to fine tolerances can be avoided.

I claim:

1. An inductor for producing constant quality foam at varying output, comprising a first tubular member having a lateral port therein, a second tubular member mounted in said first member and having a first end portion adjacent the inside opening of said port, a third tubular member slidably mounted in said first member and having a second end portion with a first surface thereof coplanar with and operatively disposed in said opening to vary the size thereof, said first and second end portions being adapted to form a space therebetween of variable cross-sectional extent commensurate with the sliding movement of said third member, said space communicating with said opening, whereby said sliding movement simultaneously and correspondingly varies the cross-sectional extent of said space and the size of said opening.

2. An inductor according to claim 1 wherein said first end portion has a conical external surface and said second end portion has a conical internal surface, said conical surfaces being cooperatively disposed to define an annular space therebetween.

3. An inductor according to claim 1 wherein said second and third members are mounted on the same axis, said third member being slidable along said axis.

4. An inductor according to claim 3 wherein said third member is helically slidable along said axis.

5. An inductor according to claim 4 wherein an annular member of varying axial length is co-axially mounted at the periphery of said second end portion, said first surface being the exterior surface of said annular member, whereby rotation of said annular member relative to said second end portion regulates the size of said opening separate from regulating the extent of said space.

6. An inductor according to claim 1 further comprising means for sliding said third member, said means including a pin connected to said third member, a slotted plate mounted for pivotal movement parallel to said third member, said pin being slidably engaged in the slot of said plate, said slot being so angularly disposed with respect to said third member that pivoting of said plate causes sliding of said third member.

7. An inductor according to claim 6 wherein said slotted plate is mounted for rotation about the axis of said third member and said pin slidably engaged in the slot of said plate, said first member having a helical slot therein, said pin being also slidably engaged in said helical slot, said slots being so angularly disposed with respect to said thrid member and to one another that movement of said pin parallel to said axis causes helical sliding of said third member.

References Cited in the file of this patent

UNITED STATES PATENTS

| 73,757 | Rue | Jan. 28, 1868 |
|---|---|---|
| 198,891 | Lynde | Jan. 1, 1878 |
| 304,227 | Murdock | Aug. 26, 1884 |
| 535,360 | Davies et al. | Mar. 12, 1895 |
| 747,006 | Simpson et al. | Dec. 15, 1903 |
| 778,122 | Erfurt | Dec. 20, 1904 |
| 1,546,712 | Brooke | July 21, 1925 |
| 1,596,523 | Friedman | Aug. 17, 1926 |
| 1,671,851 | Brown | May 29, 1928 |
| 2,127,186 | Perkins | Aug. 16, 1938 |

FOREIGN PATENTS

| 37,721 | Norway | Aug. 20, 1923 |